June 6, 1961 F. R. BRINKMAN 2,986,814
GASKET CUTTING TOOL
Filed Dec. 11, 1958 3 Sheets-Sheet 3

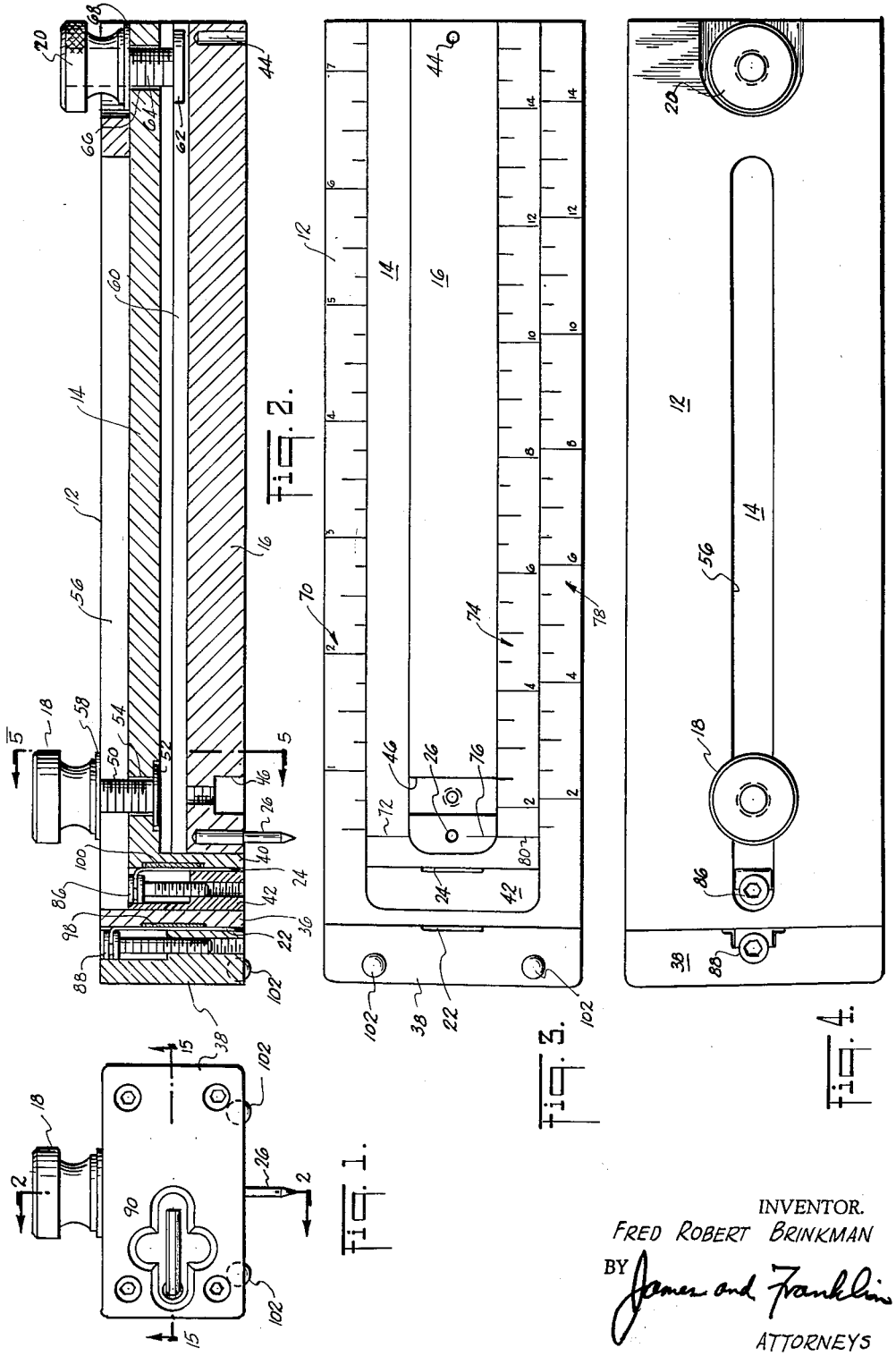

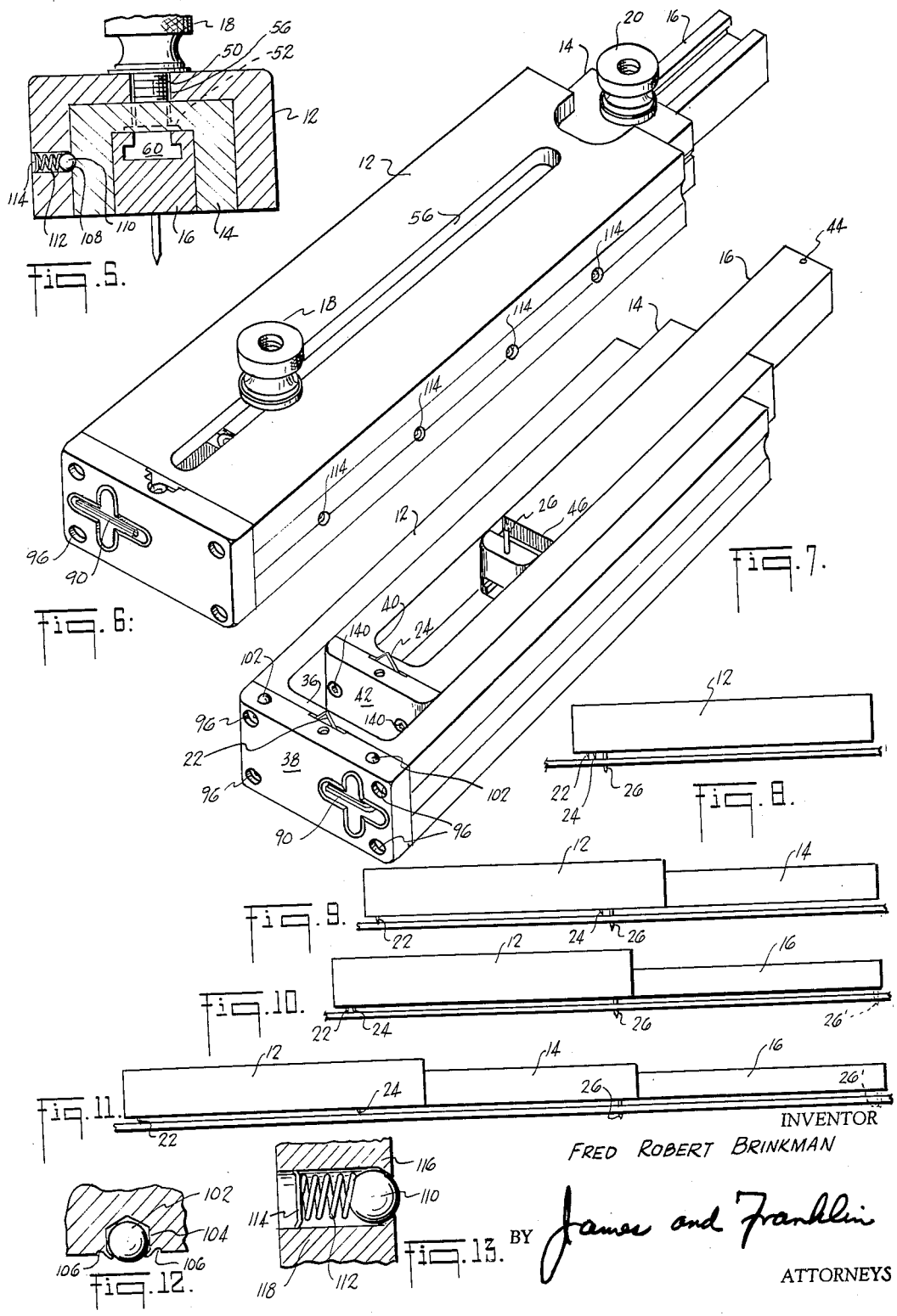

INVENTOR
FRED ROBERT BRINKMAN

BY *James and Franklin*

ATTORNEYS

United States Patent Office 2,986,814
Patented June 6, 1961

2,986,814
GASKET CUTTING TOOL
Fred Robert Brinkman, 25 Saxon Woods Road,
White Plains, N.Y.
Filed Dec. 11, 1958, Ser. No. 779,686
12 Claims. (Cl. 30—300)

This invention relates to cutting tools, especially for cutting circles, and more particularly to a manually operable gasket cutting tool.

The primary object of the present invention is to generally improve manually operable cutting tools of the specified character.

A more particular object is to provide such a tool which makes it possible to simultaneously cut concentric circles, thus providing an annular gasket in a single operation. This is done by the provision of three relatively slidable members with independent clamping means, and in preferred form, the three members are telescopically related, and are received one within the other with their bottom surfaces flush.

In accordance with a further feature, these bottom surfaces may be provided with a scale which indicates the diameter of a circle generated by the inner blade; another scale which indicates the spacing between the inner and outer blades; and a third scale which indicates the diameter of a circle generated by the outer blade when the pin is in a predetermined relation to the inner blade.

A further object of the present invention is to facilitate separation of two of the slidable members from the third, thereby providing a smaller and lighter tool for cutting a single circle. An ancillary object is to devise rolling detent means which holds the members in alignment yet do not prevent separation of the members when desired.

Still another object is to provide the bottom of the cutting tool with anti-friction balls which roll freely on the surface of the material being cut. This presupposes a desired projection of the cutting blade beneath the member carrying the same, and in accordance with another object of the invention, an accurately controllable screw adjusting means is provided for varying the projection of the cutting blade.

A further object of the invention is to provide the cutting tool with means to facilitate its use to score or cut a straight line, or two parallel straight lines.

To accomplish the foregoing objects, and other more specific objects which will hereinafter appear, my invention resides in the cutting tool elements and their relation one to another as are hereinafter more particularly described in the following specification. The specification is accompanied by drawings in which:

FIG. 1 is an end view of a cutting tool embodying features of my invention;

FIG. 2 is a longitudinal section through the cutting tool, with members telescoped together;

FIG. 3 is a bottom plan view of the cutting tool;

FIG. 4 is a top view of the same;

FIG. 5 is a transverse section taken approximately in the plane of the line 5—5 of FIG. 2;

FIG. 6 is a perspective view looking downward and showing the tool with the members spread somewhat for cutting a gasket of moderate size;

FIG. 7 is a similar perspective view, but with the tool inverted to show the bottom;

FIG. 8 is a side elevation showing the relation of the parts for a minimum size gasket;

FIG. 9 is a side elevation showing the relation of the parts for a larger gasket with a small center hole;

FIG. 10 is a side elevation showing the relation of the parts for a very narrow gasket, that is, one having a large center hole;

FIG. 11 shows the relation of the parts for a relatively large gasket with a large center hole;

FIG. 12 is a fragmentary section showing an anti-friction ball used at the bottom of the tool;

FIG. 13 is a fragmentary section showing a spring pressed detent element used between the slidable members;

Figure 14:
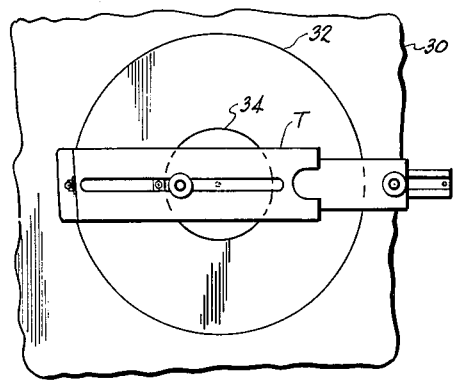
FIG. 14 is a plan view showing the tool in use.

Referring to the drawing, and more particularly to FIGS. 6 and 7, the cutting tool comprises three longitudinally slidable or telescopically related members 12, 14 and 16. There is a clamp means or screw 18 for locking the longitudinal adjustment of member 14 relative to member 12, and a second clamp means or screw 20 for locking the longitudinal adjustment of the third member 16 relative to the second member 14. A cutting blade 22 (FIG. 7) projects transversely from the member 12. A second cutting blade 24 projects transversely from the member 14. A pin 26 projects transversely from the third member 16. The arrangement is such that two circles may be simultaneously cut by the blades 22 and 24 about the pin 26 to provide an annular gasket. Thus, referring to FIG. 14 of the drawing, the cutting tool T is being used to cut concentric circles 32 and 34 in a sheet or panel of gasket material 30, thereby providing an annular gasket defined between the circles 32 and 34.

Reverting to FIGS. 6 and 7, and referring also to FIG. 5, it will be seen that the member 12 is an elongated "outer housing" of channel section, this housing being open at one end and closed at the other end 36. The closed end receives a plate or head 38 which adjustably supports the cutting blade 22.

The member 14 may be called an "inner housing" because it too is of channel section, and is received in the channel of outer housing 12. It preferably is in flush relation thereto at the bottom. Inner housing 14 is open at one end, and is closed at the other end, as shown at 40. It too receives a plate or head 42, which adjustably supports the cutting blade 24.

The third member 16 is a "slide bar" which is received in the channel of the inner housing 14. Here again it is preferred that the parts be in flush relation at the bottom of the tool. The center pin 26 is received in a mating hole in the slide bar 16. It is received somewhat frictionally, and may be pulled out and inserted in a mating hole 44 at the opposite end of the slide bar. The slide bar also has a transverse slot 46 which is dimensioned to detachably receive a guide block, not shown in FIG. 7, the purpose of which is described later.

The clamp means 18 may be described with reference to FIGS. 2 and 5 of the drawing. A screw 50 having a flat head 52 passes freely through a hole 54 in the inner housing 14. The screw is slidably received in a long slot 56 cut through the top of member 12, and receives a washer 58 and a knurled thumb nut. It will be evident that on loosening the thumb nut, member 14 may be slid longitudinaly relative to member 12, and that on tightening the thumb nut, the parts will be locked in desired position.

The top of slide bar 16 is provided with a T slot 60. This receives the head 62 (FIG. 2) of a screw 64 which passes through a hole 66 near the open end of inner housing 14. A washer 68 and thumb nut are placed on screw 64, and when the thumb nut is loosened the slide bar 16 may be slid longitudinally of the inner housing 14, but when the thumb nut is tightened the parts are locked in desired position. It will be understood that the head 62 may be provided with flats to prevent rotation of the screw, and to increase the holding area. It will also be understood that by removing the thumb nut 18, the inner housing 14 with the slide bar 16 are readily removed from the outer housing 12. Similarly, by removing the thumb nut 20, the slide bar 16 could be removed from the inner housing 14, but there would be no purpose for this.

Referring now to FIG. 3, the bottom of the tool is conveniently provided with scales to facilitate setting the blades and pin in desired relation. Specifically, there is a scale 70 on the outer housing 12 which cooperates with a mark 72 on the inner housing 14. The scale indicates the spacing between the cutting blades 22 and 24.

There is another scale 74 on the inner housing 14. This scale cooperates with a mark 76 on the slide bar 16 and indicates the adjustment as between the blade 24 and the center pin 26. The scale may be in terms of radius or diameter, and is here indicated in terms of diameter. In other words, the numerals are double the actual distance in inches, and indicate the diameter of a circle described when cutting blade 24 is revolved around pin 26.

The bottom of outer housing 12 carries another scale indicated at 78. This scale is not essential but is convenient because in "heavy duty" cases the blade 22 may be used to cut a circle around pin 26 as a center, with blade 24 elevated and not in use. In such case, the slide bar 16 may be moved fully into the inner housing 14, thereby bringing the pin 26 and marker 76 in alignment with a marker 80. The latter cooperates with scale 28 and indicates the diameter of a circle produced by cutter 22 turning on pin 26 as a center. When using both blades, the scale distances may be added to obtain the larger diameter. The scales are omitted in FIG. 7.

Figure 17:
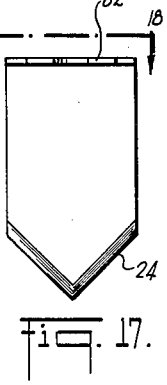
FIG. 17 shows the inner cutting blade.
Figure 18:
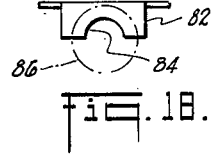
FIG. 18 is a plan view of the blade shown in FIG. 17.

The cutting blades are vertically adjustable, and in the present case are provided with screws for that purpose. Referring to FIGS. 17 and 18, the cutting blade 24 has a V-shaped cutting edge. A part of the blade, most simply its upper end, is bent sidewardly as shown at 82, and is arcuately notched at 84. The adjusting screw shown at 86 in FIG. 2 has a head with a groove to receive the notched part of the blade. The shank of the screw is threadedly received in the head 42 of the inner member 14, and it will be evident that by rotating the screw, it is raised or lowered and correspondingly raises or lowers the blade 24. In FIG. 2 the blades have been raised for safety. In FIG. 7 they have been lowered.

A similar construction is provided for the blade 22, but blade 22 may be longer than blade 24, as is shown in FIG. 2. The upper end of the blade is similarly bent sidewardly, and notched to receive the grooved head of an adjusting screw 88 which is threadedly received in the head 38. Rotation of the screw raises or lowers the blade.

Figure 15:
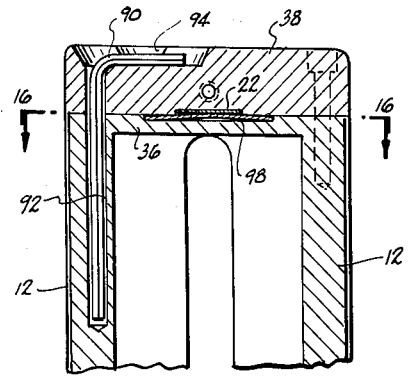
FIG. 15 is a horizontal section taken approximately in the plane of the line 15—15 of FIG. 1.

The screws here used are Allen head screws, the upper ends of which are shown at 86 and 88 in FIG. 4 of the drawing. They are turned by means of a conventional Allen wrench, and this may be stored in the tools as shown at 90 in FIGS. 1, 6, 7 and 15. The disposition of the tool is clearly shown in FIG. 15, which is a horizontal section. The outer housing 12 is drilled at 92 to receive the longer part of the Allen wrench 90. The head 38 is appropriately recessed at 94 to receive the shorter end of the wrench, and also to facilitate seizing the wrench for removal. For this purpose, the recess may be given a somewhat cruciform configuration, as shown in FIG. 1.

Figure 16:
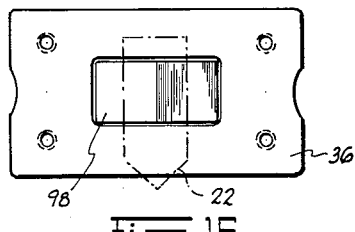
FIG. 16 is a view looking in the direction of the arrows 16—16 of FIG. 15.

The cutting blade might be clamped directly between the parts receiving the same. Thus, in FIG. 7 the blade 22 might be clamped between the end 36 and the head 38, the latter being secured in position by means of four screws located at 96. However, this would require loosening of the four screws prior to adjustment of the blade. In the present tool, the blade is held tightly, yet is movable because the grip on the same is a resilient one. Specifically, referring to FIGS. 15 and 16 of the drawing, the end 36 is recessed to receive a somewhat bowed spring 98 which is convex toward the cutting blade. The spring extends across the blade, as is indicated by the phantom showing of the blade 22 in FIG. 16. The spring is made of sufficiently heavy gauge material to exert considerable pressure against the blade. The latter is vertically movable in a guideway which is recessed into the head 38, and which has a thickness equal to or only slightly greater than the thickness of the blade.

It will be understood that a similar construction is provided for the inside housing member 14, that is, the end 40 (FIG. 7) is recessed to carry a horizontal spring which bears tightly against the blade 24, the latter being movable in a vertical guideway recessed in the head 42. These parts are also visible in FIG. 2, the spring for cutting blade 24 being shown at 100. The head 42 is secured to the end 40 much as head 38 is secured to end 36, but in this case two screws are found adequate, as indicated at 140 in FIG. 7.

The bottom of the tool is preferably provided with anti-friction balls which rest on the material being cut when the cutting blades have reached full depth. In working on relatively thick material, the blades may be lowered in several stages, so that the balls are in use throughout the cutting operation. The screws 86 and 88 (FIG. 4) make it easy to do this without raising the tool from the work.

Referring now to FIGS. 1, 2, 3, and 7 of the drawing, the anti-friction balls are shown at 102. They may be mounted in the simple fashion shown in FIG 12, in which the material of head 38 is drilled at 104 to receive ball 102 to a depth greater than the radius of the ball. The material around the ball is then staked inward somewhat by striking a ring around the ball indicated at 106. This displaces some of the metal inward sufficiently to hold the ball, but not to lock it against rotation. In the present tool these anti-friction balls are provided on only the outer head 38, and similar balls are not shown on the inner head 42. Anti-friction balls are more important on the outer head because they are of value primarily for heavy-duty operation. For that purpose the outer housing would be used even for a single circle, whereas for lighter duty work the parts 14 and 16 may be removed and used without the part 12. For the lighter duty work the anti-friction balls are less important, and therefore have been omitted from the inner head. However, they could be provided on both heads, if desired.

Another refinement in the present tool is the provision of detent means to maintain a desired flush and frictional relation during sliding of the inner housing 14 relative to the outer housing 12. Referring to FIG. 5, one of the members 12 and 14, in this case the member 14, has a groove 108 on a side face, and the other member, in this case the member 12, has a spring pressed ball 110 projecting into the groove 108. Ball 110 is pressed by a spring 112 held in place by a retainer 114. In practice, a series of such balls may be provided, and in FIG. 6 there are four such balls and retainers located at the points 114.

The balls 110 are retained against loss by a rim of metal, like the anti-friction balls 102 previously described, but the metal is derived in a different way. Referring to FIG. 13, the metal at 116 could be provided by inward staking, but is more simply provided in this case by drilling the hole 118 from left to right, but not drilling it all the way through. The spring 112 may be held in position by forcing disc 114 into position, the latter having outwardly sloping teeth around its periphery which bite into the member 12.

The projection of balls 110 may be enough to maintain a desired sliding friction, and to hold the member 14 flush with member 12 even when lock 18 is loose. The detents yield when it is desired to pull the inner housing downwardly from the outer housing after releasing the clamp means.

Figure 19:
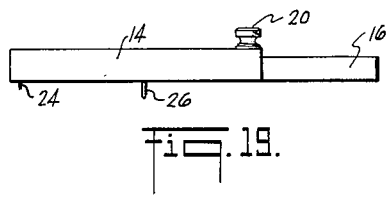
FIG. 19 is a side elevation of the inner housing and slide bar, removed from the outer housing.
Figure 20:
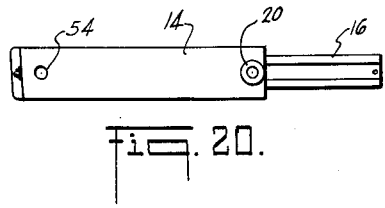
FIG. 20 is a plan view of the same.

This separation is convenient because it provides a smaller, simpler two-part tool, comprising only the inner housing member 14 and the slide bar 16, as shown in FIGS. 19 and 20. In this case there is only a single cutting blade 24 for cutting one line. The hole 54 (FIG. 20) is empty, the clamp screw having been removed. The clamp 20 locks the adjustment as between the members 14 and 16.

The T shaped slot at the top of the slide bar 16 helps hold the slide bar nested in the inner housing 14, without the need for spring pressed balls and groove. As between housing 12 and the parts 14, 16, there is a greater bulk and weight tending to drop downward when the thumb nut is loosened, and consequently the provision of spring pressed balls and groove is more important.

Figure 21:
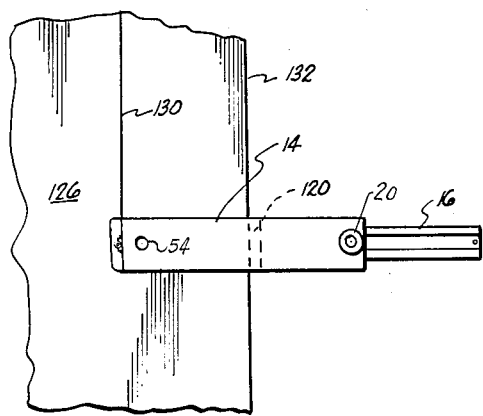
FIG. 21 shows the tool in use for the cutting of a straight line instead of a circle.
Figure 22:
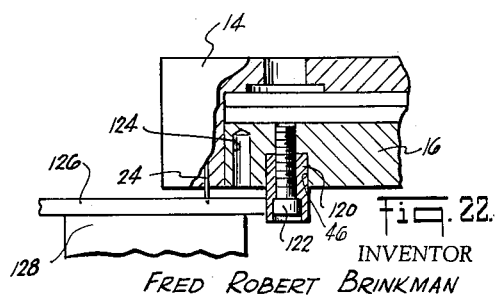
FIG. 22 is a partially sectioned side elevation showing the substitution of a guide block for a center pin when cutting a straight line.

Reference was previously made to a cross slot 46 shown in FIGS. 2, 3 and 7. This receives a guide block which may be used when scoring or cutting straight lines. This is illustrated in FIGS. 21 and 22 of the drawing. In FIG. 22, block 120 has been secured in mating slot 46 by means of an Allen head screw 122. The center pin has been removed from its hole 124. The cutting blade 24 of housing member 14 is here shown cutting material 126 resting on a support 128.

Referring to FIG. 21, the parts 14 and 16 are guided by block 120 to cut a line 130 parallel to the edge 132 of the material 126, and in this case the line 130 and edge 132 are straight.

In FIGS. 21 and 22 the tool has been simplified by removal of the outer housing. However, it will be understood that the guide block 120 may be used while retaining the outer housing in position, in which case the blade 22 may be used instead of the blade 24 for a single cut, or both blades may be used for two simultaneous parallel cuts.

The present tool is versatile in being usable over a large range of dimension. Thus, referring to FIG. 8, the blades 22 and 24 and center pin 26 have been moved close together for the cutting of a very tiny gasket. In FIG. 9 the blades 22 and 24 are far apart but the blade 24 is close to the center pin 26, thus producing a fairly large gasket with a very small hole. In FIG. 10 the blades 22 and 24 are very close together and are spaced from pin 26, thus producing a fairly large diameter gasket which is very narrow in width. In FIG. 11 the blades 22 and 24 are far apart and are far from the center pin 26, thus producing a large gasket of substantial width.

The available radius may be greatly increased by moving the center pin from the left end to the right end of the slide bar 16. It will be recalled with reference to FIGS. 2, 3 and 7 that the slide bar 16 has a hole 44 at its remote end, and this is dimensioned to receive the center pin 26, which may be pulled out of one hole and inserted in the other. Reverting now to FIGS. 10 and 11, the pin may be moved from the solid line position 26 to the dotted line position 26′, thereby adding greatly to the radius.

In brief, although the present tool is only 8¼ inches long, it will cut a circle having a diameter of forty-one inches, the tool being extendable as shown in FIG. 11 to a radius of twenty and one-half inches.

It will be noted in FIGS. 3 and 4 that the heads 38 and 42 are disposed at a slight angle to the axis of the tool. This has been found desirable in order to dispose the cutting blade at a slight angle. This insures that any play or lost motion will be taken up constantly in one direction. The angle here used draws the tool outward against the center pin when the tool is turned clockwise, as is usually the case.

The members 12, 14 and 16 are preferably made of a relatively lightweight material, typically aluminum. However, the heads 38 and 42 which threadedly receive the adjusting screws for the cutting blades are preferably made of brass or equivalent material which is somewhat harder and more wear resistant than the aluminum used in the body.

When using brass for the heads, they may have a thickness of say a quarter inch. However, the heads may be made of aluminum like the body in which case, however, the adjusting screws are preferably received in "Helicoils," that is, internally and externally threaded bushings which are made of harder metal and which are screwed permanently into the head and which themselves receive the adjusting screws. In such case more room is needed, and the heads may be made thicker, say three-eighths or one-half inch in thickness.

It is believed that the construction, operation and method of use of the improved cutting tool, as well as the advantages thereof, will be apparent from the foregoing detailed description. The tool may be used to cut plant fiber sheet, asbestos sheet, and other materials, including soft metals such as copper, brass and aluminum. The tool may be used as a two-part or three-part tool, and it may be used for a single or double cut. There is independent adjustment as between both cutting blades and the center pin. The latter is movable to either end of its slide bar, and is removable for replacement by a guide block. The blades are easily and accurately adjustable to desired cutting depth, and a wrench for the adjusting screws of the blades is conveniently carried in the body of the tool. Anti-friction ball bearings are provided at the bottom for contacting the top surface of the material being cut. Additional spring pressed detent balls may be provided between the telescopic members.

It will be apparent that while I have shown and described my invention in a preferred form, changes may be made in the structure shown without departing from the scope of the invention, as sought to be defined in the following claims.

I claim:

1. A cutting tool comprising an elongated outer housing of channel section, said outer housing being open at one end and closed at the other, and the closed end having means to adjustably support a cutting blade, an inner housing of channel section received in the channel of the outer housing, said inner housing being open at one end and closed at the other, and said closed end having means to adjustably support a cutting blade, a slide bar received in the channel of the inner housing, a center pin received in said slide bar, a clamp screw between said inner and outer housings for locking them in desired longitudinal adjustment, and a clamp screw between the slide bar and the inner housing for locking them in desired longitudinal adjustment.

2. A cutting tool as defined in claim 1, in which the center pin is removable from the slide bar, and in which the tool includes a guide block, and in which the slide bar and guide block have means to detachably mount said guide block on the bottom of the slide bar in lieu of the center pin, whereby said tool may be used to score or cut lines parallel to a guide edge of the material being cut.

3. A cutting tool comprising an elongated outer housing of channel section, said outer housing being open at the bottom and at one end and closed at the other, and the closed end having means to adjustably support a cutting blade, an inner housing of channel section received in the channel of the outer housing with their bottom surfaces in flush relation, said inner housing being open at the bottom and at one end and closed at the other, and said closed end having means to adjustably support a cutting blade, a slide bar received in the channel of the inner housing with their bottom surfaces in flush relation, a center pin received in said slide bar, a first clamp screw between said inner and outer housings for locking them in desired longitudinal adjustment, and a second clamp screw between the slide bar and the inner housing for locking them in desired longitudinal adjustment, said first clamp screw being readily removable and thereby affording ready detachability from the outer housing of the inner housing with the slide bar for use of the latter alone.

4. A cutting tool as defined in claim 3, in which the center pin is removable from the slide bar, and in which the tool includes a guide block, and in which the slide bar and guide block have means to detachably mount said guide block on the bottom of the slide bar in lieu of the center pin, whereby said tool may be used to score or cut lines parallel to a guide edge of the material being cut.

5. A cutting tool comprising an elongated outer housing of channel section, said outer housing being open at the bottom and at one end and closed at the other, and the closed end having means to adjustably support a cutting blade, an inner housing of channel section received in the channel of the outer housing with their bottom surfaces in flush relation, said inner housing being open at the bottom and at one end and closed at the other, and said closed end having means to adjustably support a cutting blade, a slide bar received in the channel of the inner housing with their bottom surfaces in flush relation, a center pin received in said slide bar, a clamp screw between said inner and outer housings for locking them in desired longitudinal adjustment, a clamp screw between the slide bar and the inner housing for locking them in desired longitudinal adjustment, and a scale on one of the bottom surfaces for indicating the relative adjustment of the inner housing to the outer housing in terms of the spacing between the cutting blades.

6. A cutting tool comprising a first member in the form of an elongated housing of channel section, said housing being open at the bottom and at one end and closed at the other, said closed end carrying a cutting blade, a telescopically slidable second member received in said channel, a clamp screw for fixing the longitudinal adjustment of said members, and means independent of the clamp screw for holding said members in assembled slidable relation, said means comprising a groove on a side face of one member and a spring pressed ball projecting slightly from the adjacent wall of the other member, said ball being received in said groove.

7. A cutting tool comprising an elongated housing of channel section, said housing being open at the bottom and at one end and closed at the other, said closed end carrying a cutting blade, a telescopically slidable member received in said channel with their bottom surfaces in flush relation, a clamp screw for fixing the longitudinal adjustment of said housing and member, and means independent of the clamp screw for holding said housing and member in assembled slidable relation, said means comprising a groove on a side face of the member, and a series of spring pressed balls projecting slightly from the adjacent channel wall of the housing, said balls being received in said groove and acting as yieldable detents, whereby said member is transversely separable from said housing.

8. A cutting tool comprising telescopically related members, one of which carries a cutting blade and the other of which carries a pin, one of said members being inverted channel-shaped and the other being received flush within the channel to provide a smooth bottom surface for use adjacent the top surface of the material which is being cut, and one of said members having one or more small round balls received in the lower face thereof and only partially projecting therefrom, said balls being freely rotatable in all directions and acting as anti-friction bearings between the tool and the work being cut.

9. A cutting tool as defined in claim 8, in which the center pin is removable from the member carrying the same, and in which the tool includes a guide block, and in which the member and the guide block have means to detachably mount said guide block on the bottom of said member in lieu of the center pin, whereby said tool may be used to score or cut a line parallel to a guide edge of the material being cut.

10. A cutting tool comprising slidably related bars, one of which carries a pin and the other of which carries an upright cutting blade, said cutting blade being received in an upright guide channel, and means for adjusting the downward projection of the lower cutting end of the blade, said means comprising an upright screw having a circumferential groove, and a part of the upright blade being bent sidewardly and notched to fit in the groove of the screw, whereby rotation of the screw adjusts the projection of the blade from the bar carrying the same.

11. A cutting tool comprising telescopically related members, one of which carries a pin and the other of which carries an upright cutting blade, one of said members being inverted channel-shaped with one closed end, and the other member being received in said channel, said cutting blade being received in an upright guide channel in said closed end, and means for adjusting the downward projection of the cutting end of the blade, said means comprising an upright screw threadedly received in said closed end, said screw having a circumferentially grooved head at its upper end, and the upper end of the upright blade being bent sidewardly and arcuately notched to fit in the groove of the screw, whereby rotation of the screw adjusts the projection of the blade from the bar carrying the same.

12. A cutting tool comprising slidably related members, one of which carries a pin, and the other of which carries a cutting blade, one of said members being inverted channel-shaped with one closed end, and the other member being received in said channel, a clamp screw for locking the members in desired longitudinal adjustment, the closed end being grooved to slidably receive the blade so that the projection of said blade is adjustable, a convexed stiff leaf spring at said closed end extending across the blade and bearing with its convex face against said blade to hold the same against movement, and an end cover plate on the closed end of the channel-shaped member and outside the assembly of blade and spring, said cover plate tending to flatten the spring in order to maintain the frictional pressure of the spring against the blade.

References Cited in the file of this patent

UNITED STATES PATENTS

| | | |
|---|---|---|
| 1,189,487 | Roth | July 4, 1916 |
| 1,246,925 | Hunt | Nov. 20, 1917 |
| 1,598,993 | Vlazny | Sept. 7, 1926 |
| 1,719,663 | Koontz | July 2, 1929 |
| 1,901,764 | Mosca | Mar. 14, 1933 |
| 2,778,108 | Welsh | Jan. 22, 1957 |
| 2,810,960 | Johnson et al. | Oct. 29, 1957 |